US010988156B1

(12) United States Patent
Reiersen

(10) Patent No.: US 10,988,156 B1
(45) Date of Patent: Apr. 27, 2021

(54) REMOVABLE SHOPPING CART EXTENDER

(71) Applicant: Ronald G. Reiersen, Poulsbo, WA (US)

(72) Inventor: Ronald G. Reiersen, Poulsbo, WA (US)

(*) Notice: Subject to any disclaimer, the term of this patent is extended or adjusted under 35 U.S.C. 154(b) by 0 days.

(21) Appl. No.: 16/786,523

(22) Filed: Feb. 10, 2020

(51) Int. Cl.
B62B 3/10 (2006.01)
B62B 3/14 (2006.01)

(52) U.S. Cl.
CPC ............ *B62B 3/102* (2013.01); *B62B 3/1472* (2013.01)

(58) Field of Classification Search
CPC ......... B62B 3/102; B62B 3/10; B62B 3/1468; B62B 3/1472; B62B 3/104; B62B 3/106; B62B 3/108; B62B 3/04; B62B 3/02
USPC .................................................. 280/33.992
See application file for complete search history.

(56) References Cited

U.S. PATENT DOCUMENTS

| 2,845,729 | A | 8/1958 | Baumgart | |
|---|---|---|---|---|
| 6,641,147 | B2 | 11/2003 | Werner | |
| 7,185,898 | B2* | 3/2007 | Cote | B62B 3/1472 280/33.992 |
| 7,192,035 | B1* | 3/2007 | Lioce | B62B 3/1472 280/33.991 |
| 8,052,158 | B2* | 11/2011 | Tyrrell | B62B 3/102 280/33.992 |
| 2005/0212234 | A1* | 9/2005 | McFarland | B62B 3/102 280/33.992 |

* cited by examiner

*Primary Examiner* — John D Walters
(74) *Attorney, Agent, or Firm* — Anthony Claiborne

(57) ABSTRACT

A shopping cart extender removably attaches to a shopping cart in any of a wide range of configurations. The extender comprises a rectangular yoke hingably disposed between two upright mounts. The upright mounts are configured with upper and lower hooks to attach to corresponding horizontal members of a shopping cart. When the rectangular yoke is swung up on its hinge, the extender provides level support for long items on a shopping cart to which the extender is attached. When swung down, the extender permits an attached shopping cart to be nested with other shopping carts. Embodiments of the extender have extensions to restrain long items from lateral slipping on an attached shopping cart.

6 Claims, 7 Drawing Sheets

REMOVABLE SHOPPING CART EXTENDER

BACKGROUND OF THE INVENTION

Field of the Invention

This invention is related to shopping carts. More specifically, this invention relates to a removable extender configured to enable a cart to carry large objects.

Description of the Related Art

The common shopping cart is limited in its capacity for carrying long objects. In order to transport objects that are considerably longer than the length of the cart basket, shoppers must awkwardly carry such objects with the forward portion of the object protruding from and resting on the top of the basket's front, and with the rear portion of the object balanced on the handle of the cart, perhaps ungainly retaining the object by hand, clutching both the object and the handle. Long objects transported in this manner often tend to slide laterally across the cart, or slide forward because of the incline from the cart handlebar to the basket front, risking falling.

Related art has attempted to address these problems in a number of ways. U.S. Pat. No. 6,641,147 to Werner depicts a very wide variety of embodiments of shopping carts, in which either the basket or the frame of the cart is fashioned to provide for the special accommodation of large or elongated objects. Werner's embodiments include carts in which the basket has an opening in the front and back to accommodate a long object horizontally, carts in which the basket bottom has an opening to accommodate a long object vertically, carts to which foldable fixtures are attached to hold objects vertically outside the basket, carts with holders under the basket to retain objects horizontally, and carts to which plates are affixed with slidable u-shaped carriers for holding objects horizontally. A limitation of all these technologies is that they require the fabrication of specialized carts. Further, adopting any of this technology would require a user to replace their existing carts. Yet further, Werner's many embodiments generally don't accommodate the nesting of shopping carts that is widely practiced when carts are not in use.

U.S. patent application publication number 2005/0212234 by McFarland teaches a shopping cart to which a hinged extender of bent cylindrical steel rod is permanently attached. The u-shaped extender may be rotated into an upright position for holding a long object horizontally and rotated into a downward position when not in use. While McFarland's cart can be configured so that nesting is possible with the extender in the downward position, it is subject to several limitations.

McFarland's extender's configuration relies on a cart with basket comprising a framework of rod material, preferably steel, with pieces having a circular cross-section allowing engagement with a hook in the extender to form a hinge. However, the baskets of many if not most carts in use today are fabricated of molded plastic material with sides and top presenting a framework of rectangular instead of circular cross-sectional elements. Retrofitting such modern carts to use McFarland's extender would require considerable additional engineering.

Even for carts that are fabricated of the requisite rod material, retrofitting such carts to use McFarland's extender will require the bending of the stiff steel rod of the extender around a cooperating portion of the cart, a process requiring special tools. Yet further, McFarland's extender may not be sufficiently rugged to withstand repeated use. McFarland's mounts, comprising simply bent rod material very specifically formed for each individual cart, are destined to fail over time. Replacement or repair of an extender will present problems similar to those presented in retrofitting carts.

U.S. Pat. No. 7,192,035 to Lioce teaches u-shaped brackets that may be removably attached to the side of a cart for carrying long objects horizontally. Because Lioce's brackets are removable and are adaptable to a variety of cart configurations, they enable simple retrofitting and replacement for many (but not all) existing cart types. When Lioce's brackets are removed, the carts may be nested in the usual manner.

A principal limitation of Lioce's technology is that carts cannot be nested with Lioce's accessory in place. A further limitation of Lioce's technology is that, because it relies on cart configurations and dimensions within a particular range, it is not universally adaptable for retrofitting all cart types.

It is desirable to enable a shopping cart to carry long or large objects. What is needed is a shopping cart attachment providing such utility, easily installable and removable, permitting retrofitting, repair and replacement in existing stocks of shopping carts of various configurations. What is needed further is such an attachment permitting nesting of shopping carts with the attachment in place. What is needed further is such an attachment that can be easily fabricated yet that is rugged for repeated use.

SUMMARY OF THE INVENTION

A shopping cart extender removably attaches to a shopping cart in any of a wide range of configurations. The extender generally comprises a rectangular yoke hingingly disposed between two upright mounts, the upright mounts in some embodiments in the form of two vertical L-brackets. Embodiments of the invention fashion extender L-brackets in die-stamped sheet metal such as aluminum or steel of an appropriate thickness to provide requisite robustness. Embodiments of the invention fashion the extender's rectangular yoke of rugged tubular material such as steel pipe.

The extender is configured to attach slidably and removably to the inside front face of a shopping cart. By virtue of its hinged arrangement on the extender's L-brackets, the rectangular yoke may be swung up to an upright position in order to retain long objects levelly above the cart's basket. Embodiments of the invention practice means to releasably maintain the yoke in the upright position when it is swung up. Some embodiments of the invention have portions of the yoke that extend upward on either side when the yoke is swung up, thereby restraining lateral movement of an object laid on top of the extender. Some carts with child seats are fashioned with upward extending sections on either side of the seat which can further serve to restrain lateral movement of objects retained on the cart employing the extender. In any case, when swung up the extender is at about the same level as the cart handlebar, permitting long objects, supported by the handlebar and the extender, to be transported in a level orientation, thereby reducing the risk of forward or backward shifting of the object. When swung down the extender permits the cart to be nested with other carts in a manner familiar to users of standard shopping carts When not needed, the extender can be swung down by the user. Alternatively, when a cart is nested the extender naturally swings down to rest in its downward position.

BRIEF DESCRIPTION OF THE DRAWINGS

Objects of the present invention as well as advantages, features and characteristics, in addition to methods of opera

DETAILED DESCRIPTION OF THE INVENTION

Figure 1:
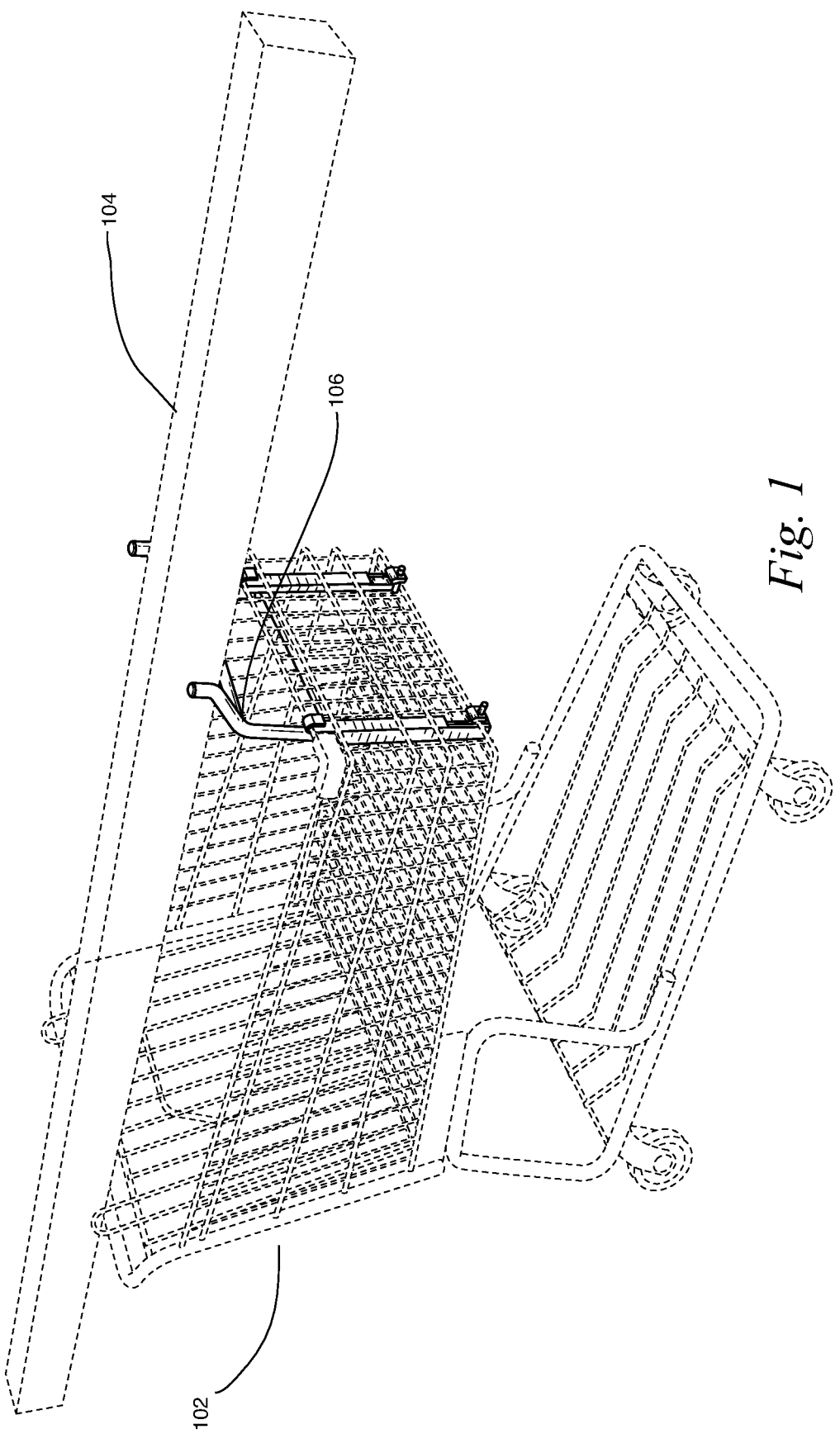
- FIG. 1 illustrates an embodiment of the extender attached to a shopping cart, the yoke of the extender in an upright position holding an exemplary long object.

Turning to FIG. 1, depicted is an embodiment of the invention in use with a shopping cart 102 carrying an exemplary load 104. An embodiment of the invention 106 (further described in reference to the drawings) is depicted with its yoke in an upright position for carrying load 104.

Figure 2:
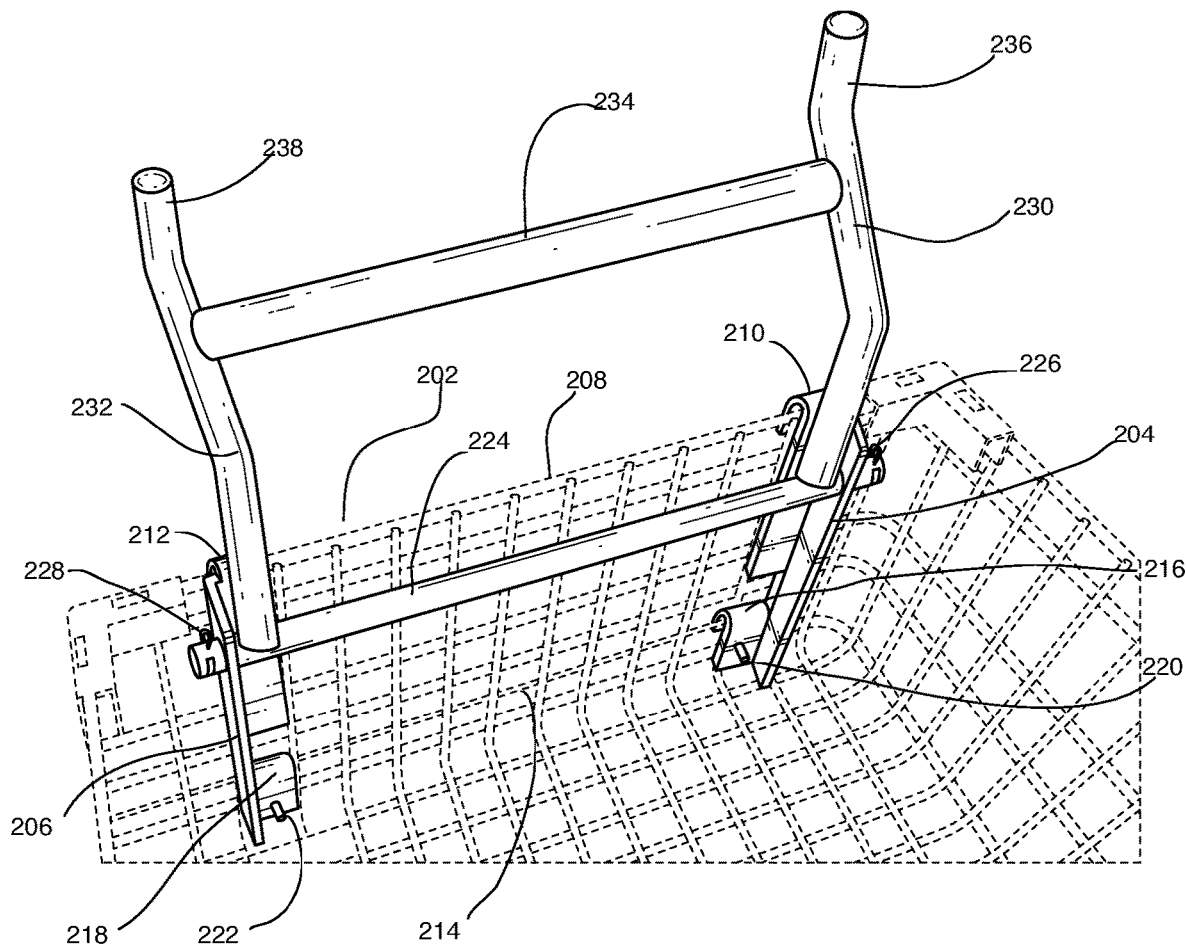
FIG. 2 depicts an embodiment of the extender attached to the shopping cart, the yoke of the extender in the upright position as in FIG. 1, as viewed from the perspective of the front interior of the shopping cart basket.

FIG. 2 is an illustration of an embodiment of the invention with yoke in an upright position as in FIG. 1, from the perspective of the interior of the shopping cart basket 202. The depicted embodiment comprises right L-bracket 204 and left L-bracket 206, removably retained on an upper horizontal member 208 of basket 202 by right upper hook 210 and left upper hook 212 and removably retained on a lower horizontal member 214 of basket 202 by right lower hook 216 and left lower hook 218 respectively. In the depicted embodiment, right upper hook 210, right lower hook 216 and left upper hook 212, left lower hook 218 are integral to right L-bracket 204 and left L-bracket 206 respectively, all formed of stamped sheet metal. As discussed in more detail in reference to FIG. 5 below, the hooks on the brackets are downward-facing, removably to engage upper horizontal member 208 and lower horizontal member 214 of basket 202 by sliding the hooks down to engage the corresponding horizontal members of basket 202. In the depicted embodiment, right L-bracket 204 and left L-bracket 206 are retained on basket 202 by way of right L-bracket clevis pin 220 and left L-bracket clevis pin 222 that constrain right lower hook 216 and left lower hook 218 respectively in engagement with horizontal member 214 of basket 202.

Disposed between right L-bracket 204 and left L-bracket 206 is rotating horizontal bar 224. Rotating horizontal bar 224 is rotatably held therein by way of receiving openings drilled or punched in right L-bracket 204 and left L-bracket 206, the openings dimensioned so that rotating horizontal bar 224 can rotate freely within them, as discussed more fully in reference to FIG. 5 below. In the depicted embodiments, rotating horizontal bar 224 is constrained between right L-bracket 204 and left L-bracket 206 by way of right bar clevis pin 226 and left bar clevis pin 228.

Affixed to rotating horizontal bar 224 are right vertical bar 230 and left vertical bar 232. Disposed between right vertical bar 230 and left vertical bar 232 and affixed distally from rotating horizontal bar 224 is fixed horizontal bar 234. In the depicted embodiment, right vertical bar 230 and left vertical bar 232 extend beyond fixed horizontal bar 234 in extension segments 236, 238 respectively.

In operation, the yoke, comprising the assembly of the vertical bars and the fixed horizontal bar, is brought to the depicted upright position by flipping the yoke up, permitted by rotation of the rotating horizontal bar to which the assembly is connected. Advantageously, in the depicted embodiment the vertical bars are bent so that their balance is off-center when the yoke is in its upright position, the yoke thereby remaining balanced in the upright position when it is flipped up. In this upright position, the depicted embodiment supports long objects upon the invention's fixed horizontal bar, retaining such objects from slipping off a side by way of the invention's extension segments of its vertical bars.

Figure 3:
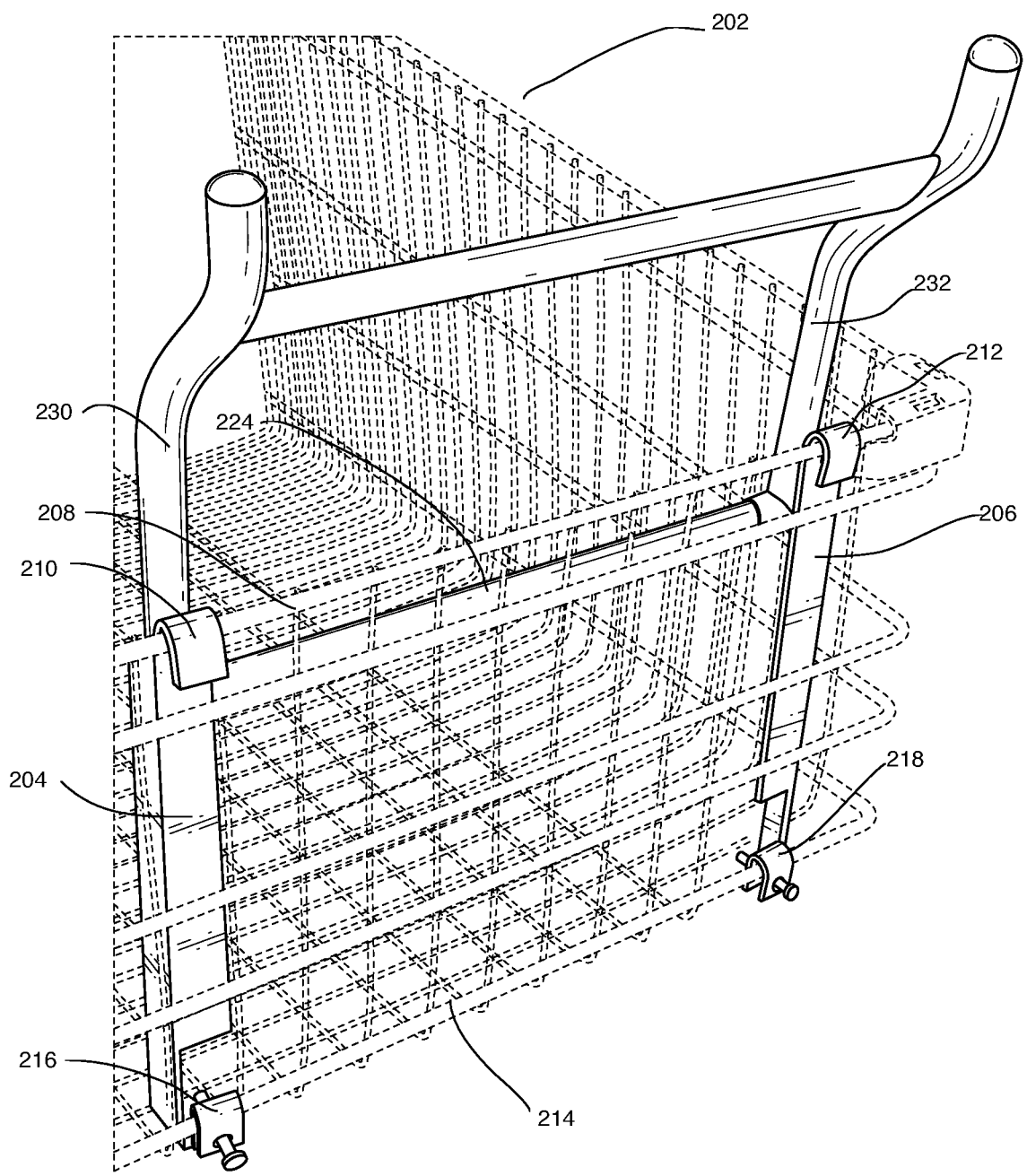
FIG. 3 depicts an embodiment of the extender attached to the shopping cart, the yoke of the extender in the upright position as in FIGS. 1 and 2, as viewed from the perspective of the front exterior of the basket.

FIG. 3 depicts an embodiment as in FIG. 2, from the perspective of the front of the cart. Depicted are right L-bracket 204 and left L-bracket 206, removably retained on basket 202 by right upper hook 210, left upper hook 212 grasping upper horizontal member 208 of basket 202, and right lower hook 216, left lower hook 218 grasping lower horizontal member 214 of basket 202 respectively. Right vertical bar 230 and left vertical bar 232 extend up from rotating horizontal bar 224 and are affixed to fixed horizontal bar 234.

Figure 4:
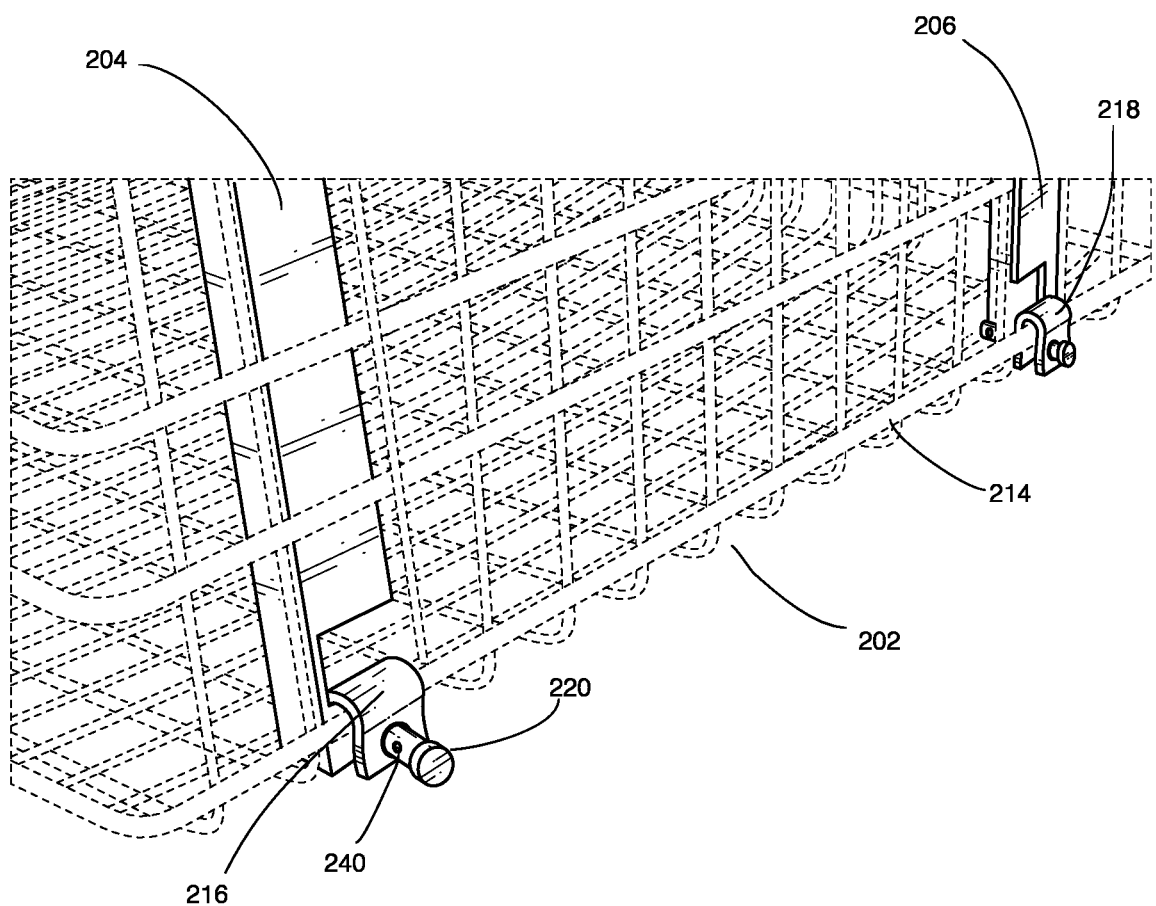
FIG. 4 is a close-up of the lower portion of the extender attached to the basket of a shopping cart, as depicted in FIG. 3.

FIG. 4 is a close-up from the same perspective as in FIG. 3, showing right lower hook 216 and left lower hook 218, fashioned in right L-bracket 204 and left L-bracket 206 respectively, to grasp lower horizontal member 214 of basket 202. Shown are left L-bracket clevis pin 222 and right L-bracket clevis pin 220. In the depiction of this embodiment, right L-bracket clevis pin 220 is partially withdrawn to reveal a hole 240 for receiving a cotter pin (see cotter pin 522 in FIG. 5) when right L-bracket clevis pin 220 is fully inserted in its receiving L-bracket.

As will be understood by those in the art, removal of cotter pins (not shown) permits removal of clevis pins 220, 222, which in turn will permit the extender to be lifted to disengage lower hooks 216, 218 and upper hooks 210, 212 (FIG. 3) from the basket, thereby enabling removal of the extender from the cart. In a similar fashion, an extender may be fitted to a cart by lowering the extender into the inside of the front of the cart so that upper hooks 210, 212 and lower hooks 216, 218 engage corresponding horizontal members of the cart basket, the extender then to be held in place by way of clevis pins 220, 222 inserted into lower hooks 216, 218, the clevis pins to be held in place by cotter pins, again as understood by those of skill in the art.

Figure 5:
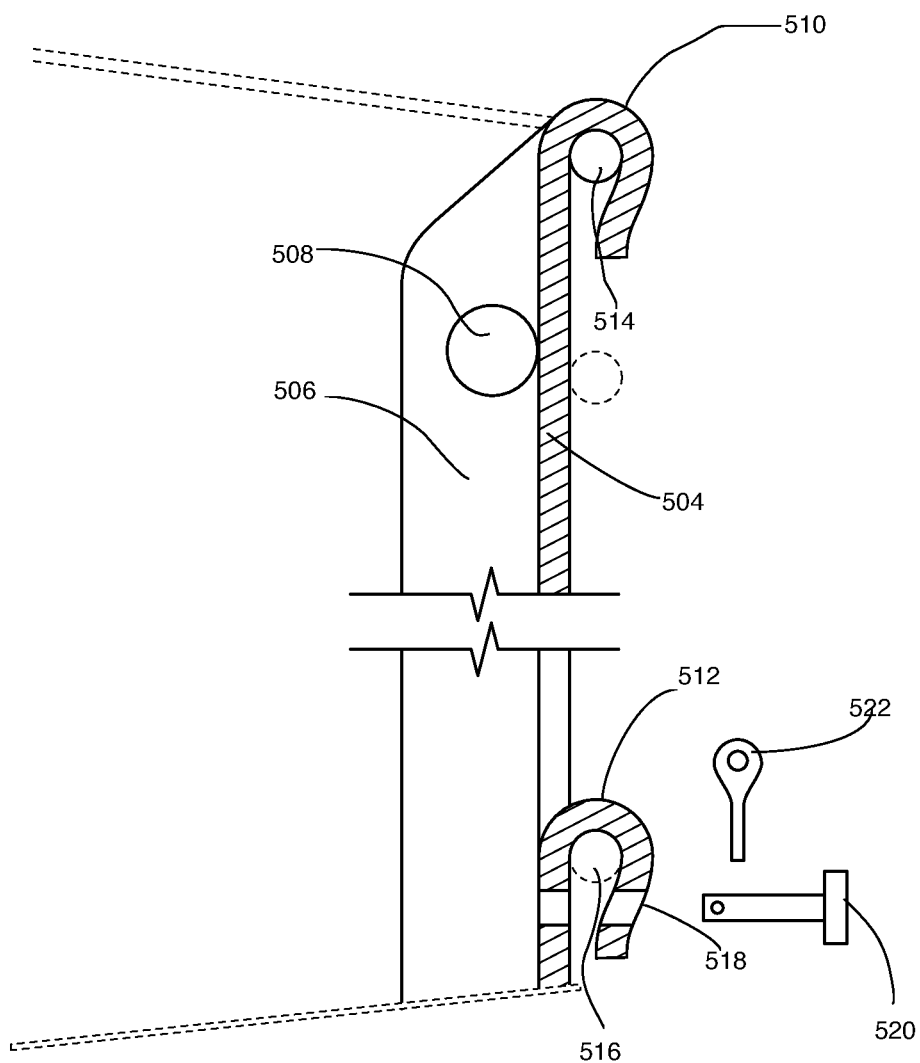
FIG. 5 is a collapsed diagrammatic representation of the side view of an L-bracket component in engagement with a shopping cart basket according to an embodiment of the invention.

FIG. 5 presents a collapsed diagrammatic representation of the side view of an L-bracket in engagement with a shopping cart basket according to an embodiment of the invention. L-bracket 504 is formed of stamped sheet metal. Within the viewing plane is bracket section 506, toward the top of which is receiving opening 508 for receiving a bar such as rotating horizontal bar 224 illustrated in FIGS. 2 and 3, opening 508 dimensioned so that the inserted bar may rotate freely. At right angle to the viewing plane is a portion of L-bracket 504 in which is formed upper hook 510 and lower hook 512, the hooks downward-facing for releasably engaging horizontal members 514, 516 of the cart basket. Within lower hook 512 is a hole 518 for receiving a clevis pin 520, for retaining L-bracket 504 on the cart, clevis pin 520 to be held in place within L-bracket 504 by way of cotter pin 522. In the depicted embodiment, both upper hook 510 and lower hook 512 are formed in a shepherd's hook shape, advantageously better to grasp horizontal members 514, 516 thereby securely retaining this embodiment of the invention removably in place on the shopping cart.

Figure 6:
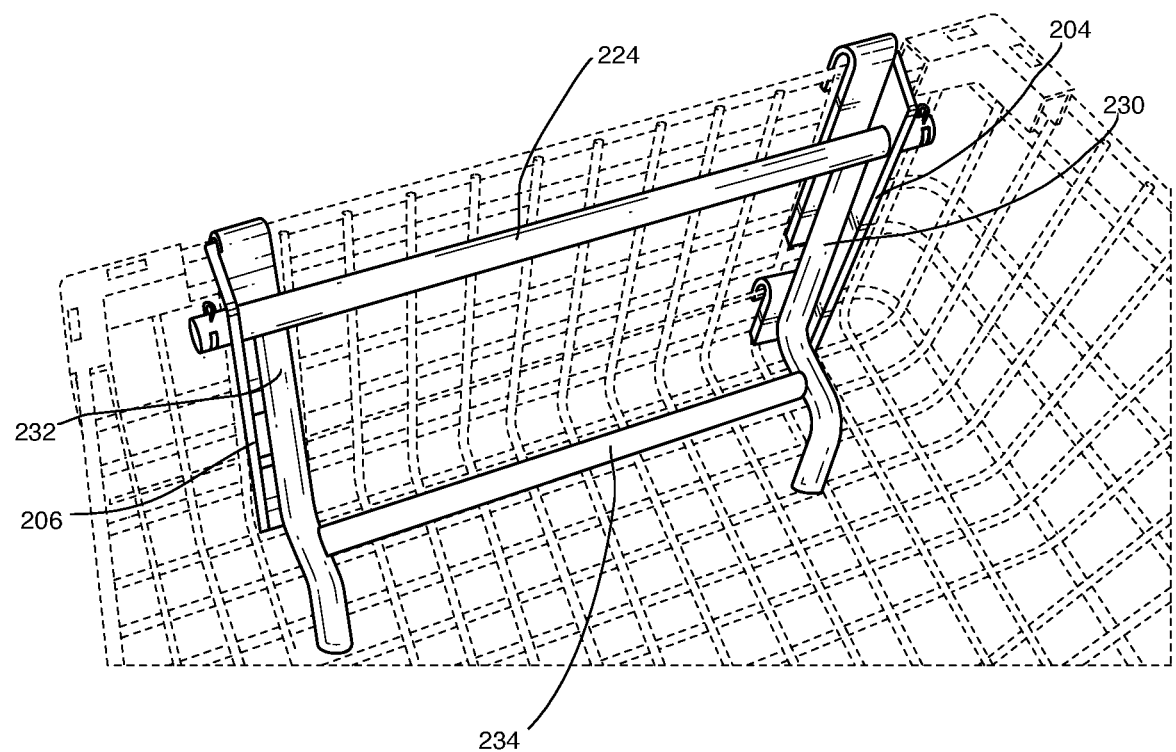
FIG. 6 depicts an embodiment of the invention as in FIG. 2, but with the yoke of the extender in the downward position.
Figure 7:
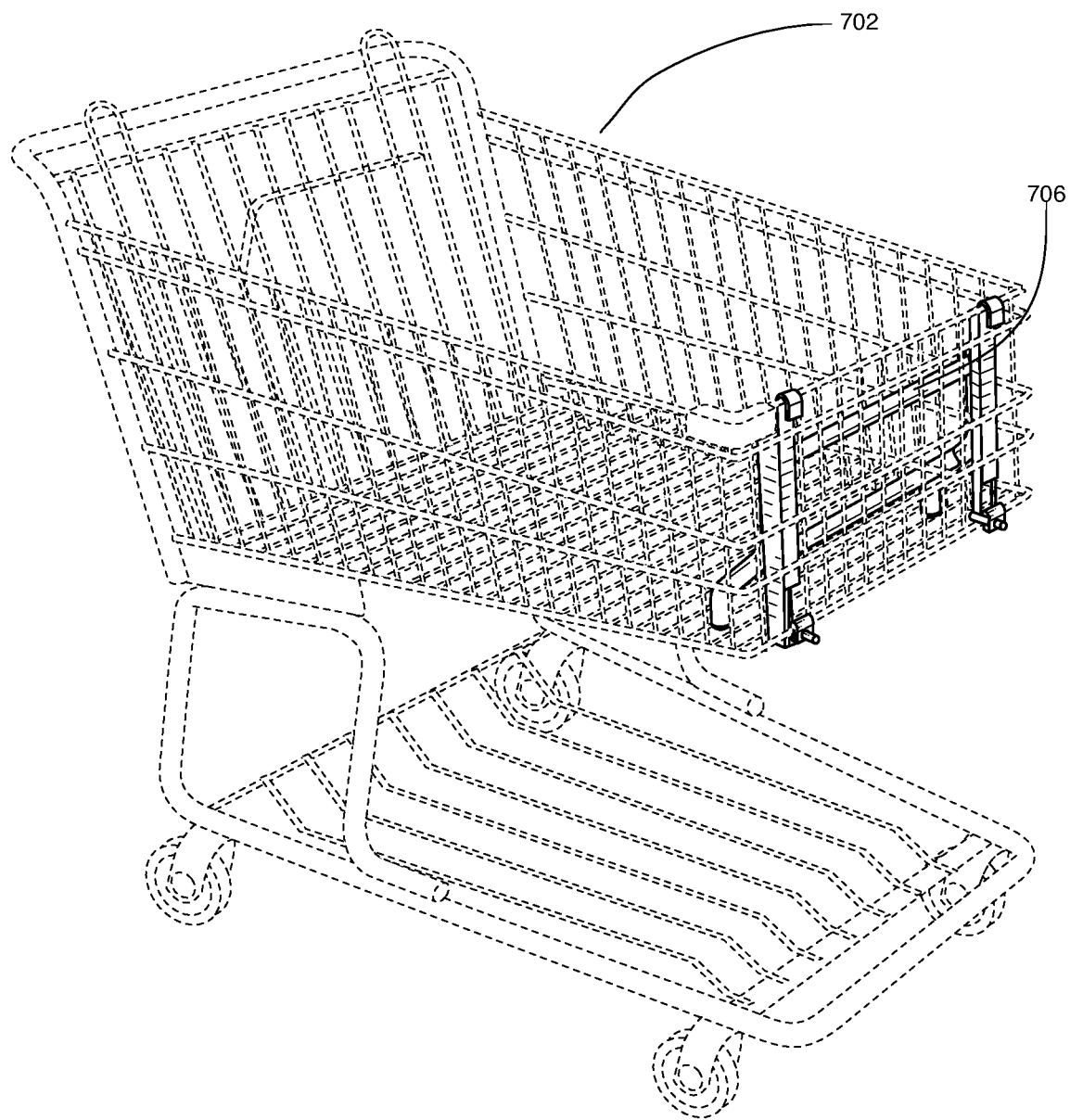
FIG. 7 illustrates an embodiment of the extender attached to a shopping cart, showing the yoke of the extender in a downward position.

Turning to FIG. 6, shown is an embodiment of the invention as depicted in FIG. 2, but now with the yoke, comprising right vertical bar 230, left vertical bar 232 and fixed horizontal bar 234, flipped down into a downward position. The invention permits a user to change the orientation of the yoke from an upright position, as shown in FIG. 2 to this downward position by grasping the fixed horizontal bar 234 and rotating the yoke on the axis of rotating horizontal bar 224 which is rotatable within right L-bracket 204 and left L-bracket 206. Referring now to FIG. 7, because the extender 706 with yoke in the downward position does not change the profile of the cart, a cart 702 with the yoke in the downward position as shown may be nested with other carts in the conventional manner known to those of skill in the art.

It will be appreciated by those of skill in the art that the functionality of the present invention may be practiced in embodiments other than those depicted. For example, the embodiment depicted in FIG. 2 has the vertical bars of the invention bent so that the yoke is over-center when in the upright position, thereby keeping the yoke upright when it is flipped up. Different embodiments may use other means for retaining the yoke in the upright position. For example, any of various means may be employed to bias the rotating bar to keep the yoke upright, including: a cam biased by a leaf spring; a coil spring; a pneumatic cylinder; and a counter-weight opposing the lowering of the yoke. Embodiments of the present invention may practice any such means.

While the invention has been described with a certain degree of particularity, it should be recognized that elements thereof may be altered by persons skilled in the art without departing from the spirit and scope of the invention. Accordingly, the present invention is not intended to be limited to the specific forms set forth herein, but on the contrary, it is intended to cover such alternatives, modifications and equivalents as can be reasonably included within the scope of the invention. The invention is limited only by the following claims and their equivalents.

I claim:

1. A removable shopping cart extender, comprising:
a left and a right upright mount, the left and right upright mounts each further comprising an upper hook and a lower hook, the upper hook and the lower hook configured to engage removably with corresponding horizontal members of a shopping cart;
a rectangular yoke hingingly disposed between the left upright mount and the right upright mount, the rectangular yoke comprising:
a rotating horizontal bar, rotatingly retained by and between the left upright mount and the right upright mount;
a left vertical bar affixed proximate the left side of the rotating horizontal bar;
a right vertical bar affixed proximate the right side of the rotating horizontal bar;
a fixed horizontal bar affixed between the left vertical bar and the right vertical bar, distal the rotating horizontal bar;
whereby, when the left and right upright mounts are engaged with corresponding horizontal members of a shopping cart, the rectangular yoke may be flipped between an upright position, thereby providing support for long objects on the cart, and a downright position, thereby enabling the cart to be nested; and
whereby the extender may be removed from a shopping cart by disengaging the upper hooks and the lower hooks of the left and right upright mounts from corresponding horizontal members of the cart.

2. The removable shopping cart extender according to claim 1,
wherein the left vertical bar further comprises:
a left extension segment extending beyond the fixed horizontal bar, distal the rotating horizontal bar; and
wherein the right vertical bar further comprises:
a right extension segment extending beyond the fixed horizontal bar, distal the rotating horizontal bar.

3. The removable shopping cart extender according to claim 1,
wherein the left upright mount and the right upright mount are fashioned from L-brackets.

4. The removable shopping cart extender according to claim 1,
wherein at least one of the upper hook of each of the left upright mount and the right upright mount, and the lower hook of each of the left upright mount and the right upright mount is fashioned in a shepherd's hook shape to releasably engage and retain a corresponding horizontal member of a shopping cart.

5. The removable shopping cart extender according to claim 1,
further comprising a means for releasably retaining the yoke in an upright position.

6. The removable shopping cart extender according to claim 5,
wherein the means for releasably retaining the yoke in an upright position is over-center balance of the left vertical bar and right vertical bar, a spring-biased cam, a coil spring, a pneumatic cylinder, or a counter-balance.

* * * * *